Aug. 27, 1963
E. F. HUDDLE
3,101,954
SELF ADJUSTING SEAL
Filed June 15, 1960
2 Sheets-Sheet 1
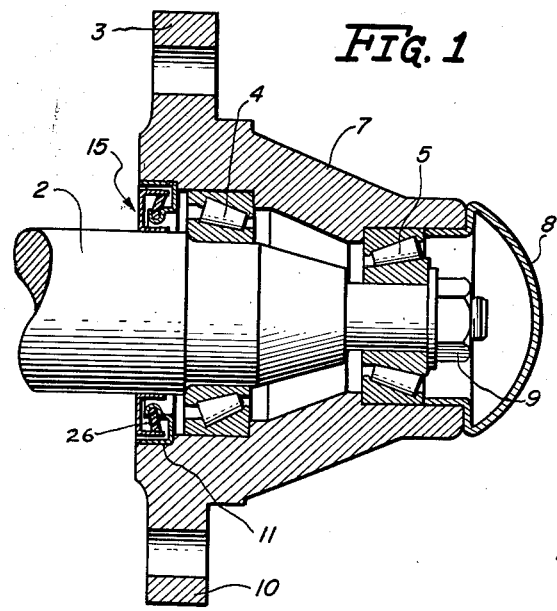
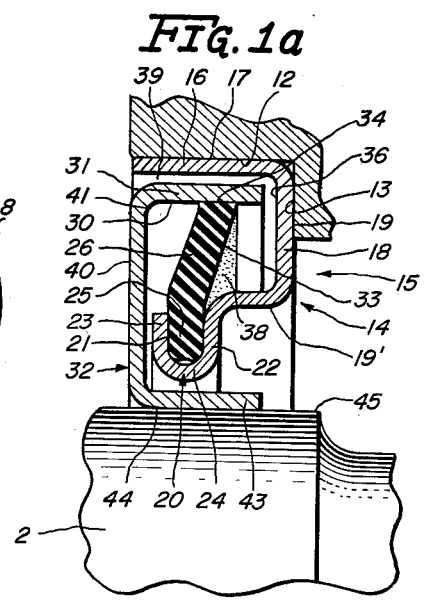
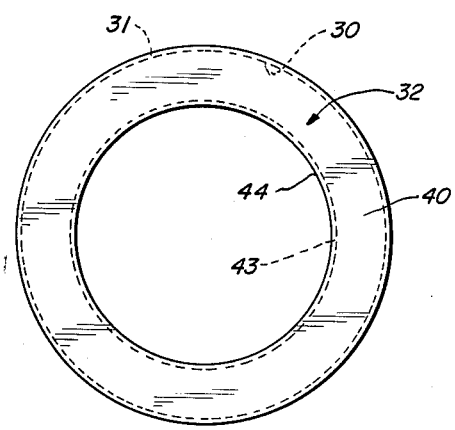
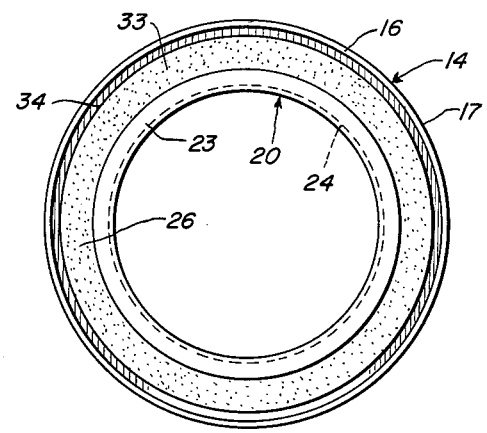
INVENTOR.
Edwin F. Huddle
Paul O. Pippel
Atty.

Aug. 27, 1963 — E. F. HUDDLE — 3,101,954
SELF ADJUSTING SEAL
Filed June 15, 1960 — 2 Sheets-Sheet 2
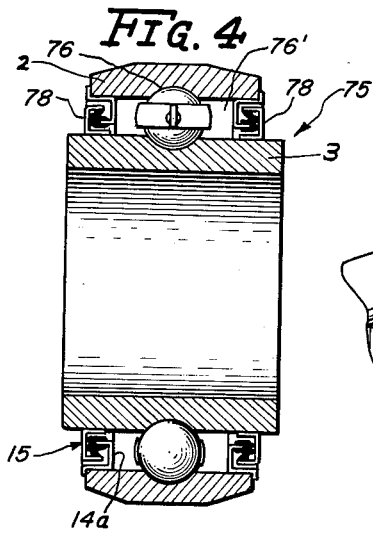
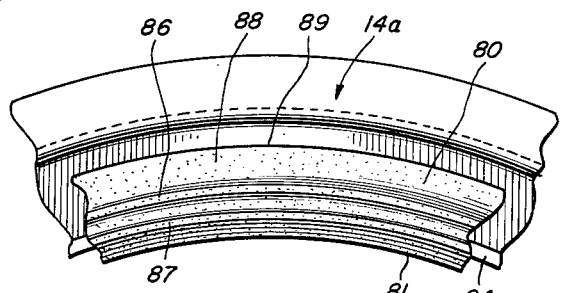
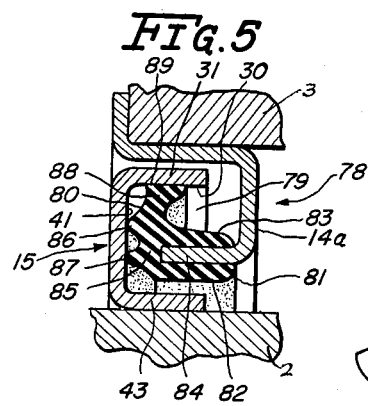
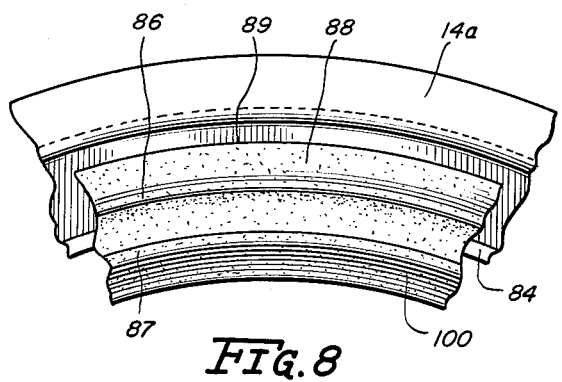
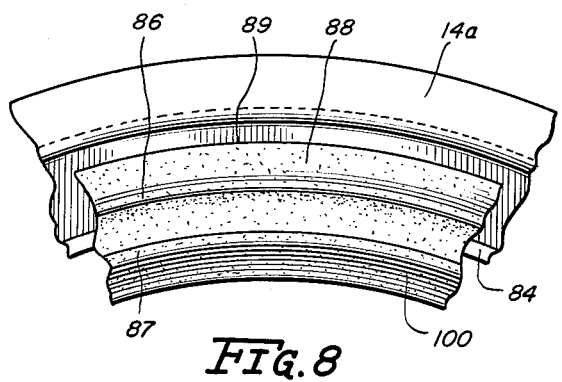
INVENTOR.
Edwin F. Huddle
Atty.

United States Patent Office 3,101,954
Patented Aug. 27, 1963

3,101,954
SELF ADJUSTING SEAL
Edwin F. Huddle, Elmwood Park, Ill., assignor to International Harvester Company, Chicago, Ill., a corporation of New Jersey
Filed June 15, 1960, Ser. No. 36,366
9 Claims. (Cl. 277—39)

This invention relates to seals and more specifically to a novel seal which is effective to retain grease and the like in bearings and which prevents the entry of dirt into the lubricant.

A general object of the invetnion is to provide a novel, inexpensive and effective seal which will function trouble free and have extremely long life and service.

A more specific object of the invention is to provide a novel seal incorporating a pair of axially telescoping elements interposed between a pair of relatively rotatable members and so arranged that one of the elements carries a sealing ring which slides against a wear surface on the other element and is constantly under a self-imposed loading while in wiping relation to the other element.

A more specific object of the invention is to provide a novel seal wherein the sealing elements include a pair of annular or tubular concentric members disposed in telescoping relation and providing overlapping annuli, the innermost annulus supporting a flexible sealing element which includes a generally radially extending sealing element which is stressed axially and tends to straighten out to a radial position and wherein the side of the sealing element away from which the radial portion is deflecting is open to the atmosphere so that upon the entry of dirt and the like into the space behind the sealing element the dirt will tend to wedge the sealing element tightly against the annulus of the outer sealing member to augment the bias in the element to sealing position.

A still further object of the invention is to provide a novel sealing arrangement which includes a pair of channel-shaped ring elements, each of which comprises a radial web and a pair of axially extending flange portions and the flange portions of the outer element intercalating with the flange portions of the inner element and the outermost flange of the outer element affording a press fit engagement within a bore in an outer rotatable member and the inner flange of the inner element providing a bore snugly admitting an inner rotatable member and the inner flange of the outer element carrying a sealing ring which includes a radial sealing web engaging the inner surface of the outer flange of the inner element, the said sealing web being stressed axially and in static position being normally radial and therefore tending and being biased by its own distortion into peripheral sealing engagement with the outer flange of the inner element.

A corollary object of the invention is to provide a novel sealing arrangement, as set forth in the preceding object, and wherein the sealing element further comprises additional sealing portions which project and engage the radial web of the inner element and in a further embodiment the sealing member also comprising a radially inwardly extending web which is also axially distorted or flexed and which engages with the internal side of the inner flange of the inner element, the said seal providing two sealing areas in the previous embodiment and in the latter embodiment the seal providing three areas of sealing engagement between the inner and outer members.

These and other objects of the invention will become more apparent from the specification and the drawings, wherein:

FIGURE 1 is a radial sectional view of a wheel hub and axle structure incorporating the invention;

FIGURE 1a is an enlarged fragmentary sectional view of the structure of FIGURE 1;

FIGURE 2 is a side elevational view taken from the outer side of the inner sealing element;

FIGURE 3 is a side elevational view of the outer sealing element taken from the inner side thereof;

FIGURES 4, 5 and 6 illustrate a further modification of the invention, FIGURE 4 being comparable to FIGURE 1, FIGURE 5 being an enlarged fragmentary radial sectional view; and FIGURE 6 being a fragmentary enlarged side elevational view;

FIGURES 7 and 8 illustrate a still further embodiment, FIGURE 7 being a radial sectional view, and FIGURE 8 being an enlarged side elevational view of the structure shown in FIGURE 7 taken from the inner side thereof.

Describing the invention in detail and having particular reference to the drawings, the embodiment in FIGURES 1 through 3 is shown in connection with a center shaft 2 and a rotatable member 3 mounted thereon. It will be understood that for purposes of the present invention either member 2 or 3 may be rotatable and for purposes of clarity the same members will be referred to as being relatively rotatable. In the present instance the shaft 2 is stationary and mounts a plurality of bearings 4 and 5 which fit within a hub 7 in conventional manner, the hub being provided with a closure cap 8 at one end, which is preferably the outer end, to give accessibility to the nut or fastening arrangement 9 as is conventional. The inner edge of the hub 7 is provided with a radial web or attaching structure 10 which is adapted to fasten to a wheel or the like, it being understood that the structure 10 may be an integral part of a wheel or may be a support for the rotating shaft 2 if that is the case. The hub 3 is recessed on its inner side as at 11 (FIGURE 1) to provide a bore 12 terminating in an internal shoulder 13 (FIGURE 2) within which is fitted the annular channel-shaped outer sealing element generally designated 14 of the seal broadly indicated 15.

The outer element 14 comprises an annular axially extending outer flange 16 which has an outer periphery 17 which fits snugly within the bore 12 while the radial web portion 18 which joins or merges with the inner edge of the flange 16 seats on its external side as at 19 against the shoulder 13. The web 18 merges at its radially inner edge into an outwardly projecting axial inner flange portion 19' which merges into a retainer generally designated 20 which is of U-shape configuration in radial cross section and extends radially inwardly of flange 19' and provides an outwardly opening groove 21 defined by the radial inner and outer wall portions 22 and 23 which are joined by the axial wall portion 24 forming the bight of the U, the said walls 22 and 23 being pinched together or clinched and embracing the radially inner edge 25 of a radially outwardly extending sealing element 26 which is a rubber-like substance such as neoprene or Buna A of 60/70 durometer or the like. It may be of leather, but the synthetic elastomer material wears better.

The sealing ring 26 is preferably an annular member which under static conditions is substantially flat and is dimensioned so that the space between the retainer structure 20 and the inner or interior hardened surface 30 of the outer flange 31 of the inner shield member 32 is less than the radial width of the outer portion 33 of the sealing member. Thus the outer portion 33 is deflected inwardly or axially with respect to its radial position and the outer edge 34 engages and rubs against the internal surface 30 of the inner sealing member 32. It will be noted that the outer flange 31 is directed inwardly with respect to the flange 16 of the outer member and is substantially concentric therewith and is spaced therefrom radially inwardly with respect thereto and also is spaced axially at its inner edge from the opposing side 36 of the wall portion 18 of the outer sealing member. Therefore, the inner and outer members are relatively rotatable without physical contact with each other. It will be understood that the flange 31 is preferably case hardened or at least the surface 30 thereof is in order to minimize the wear and it will be observed that as the outer edge 34 of the seal 26 wears that the outer portion 33 of the sealing ring will gradually straighten out and if dirt should pack into the space 38 as it enters through the passage 39 defined between the outer flanges 12 and 31 of the outer and inner sealing members that the portion 33 will be deflected toward the radial wall portion 40 of the inner sealing member along the sharp radius 41 at which the flange 31 merges with the radially outer edge of the wall portion 40 and that as the wear occurs on the member 33 it will be urged by the buildup of material in the space 38 against the internal side 41 of the inner sealing element 32. The radially inner edge of the outer wall member 40 of the inner sealing element merges with the inner flange 43 which defines an axial bore 44 which snugly and tightly receives the surface 45 of the axial member 2.

In the embodiment of FIGURES 4 and 5 parts similar with that of the previous embodiment are identified by corresponding reference numerals. It will be seen that in this embodiment the inner and outer relatively rotatable members 2 and 3 represent the inner and outer races of a bearing generally designated 75 which provide a space 76' therebetween within which is received the ball and spacer structure 76. At each end of the space 76' the sealing means 78 are provided. In the present instance it will be realized that inner and outer sealing elements 14a and 15 are provided and that the element 15 is disposed in the same relative relation to the element 14a as to the element 14 in the previous embodiment and provides an inwardly open groove 79 which receives the sealing member 80 which is somewhat similar to the element 26. The element 80 comprises an annular mounting portion 81 which includes a pair of concentric rings 82 and 83 snugly embracing the inner flange 84 of the outer member 14a, the flange 84 being directed toward the wall portion 41 of the inner element 15 and entering between the outer and inner flanges 31 and 43. The rings 82 and 83 are bridged by the inner edge portion 85 of the sealing element which provides a plurality of axially directed wiper rings 86 and 87 which project and engage the internal side 41 of the wall member 40. The sealing element 81 also comprises a radially outwardly extending ring 88 which is deflected axially inwardly and normally tends to straighten out to a radial position and engages on and biases its outer edge 89 with the internal side 30 of the inner sealing element 15. It will be seen that in the present embodiment in addition to the seal between the disk-like portion 88 at the edge 89 with the surface 30, the rings 86 and 87 contacting the internal side 41 of the inner sealing element also perform a sealing function.

Referring now to the embodiment of FIGURES 6 and 7, the said embodiment compares very closely to the embodiment of FIGURES 4 through 6 and like parts are identified with corresponding reference numerals. The only difference in the instant embodiment over that shown in FIGURES 4 through 6 is the provision of an additional sealing part 100 which extends radially inwardly from the mounting portion of the sealing structure and is deflected inwardly. The flap 100 has a normal position extending radially with respect to the mounting portion and is deflected inwardly in order to provide a bias for the sealing portion 100 to engage with its edge 101 against the opposing surface 102 on the inner flange 43 of the inner sealing element 15. It will be seen that the grease crowding against the back side 103 of the sealing ring portion 100 tends in addition to the bias because of the deflection of the member 100 to additionally load the member 100 in an outward direction engaging the surface 101 with the surface 102.

It will be seen that in this embodiment the seal provides a multiple sealing engagement with the inner member which is a hardened metallic structure.

It will be understood that the foregoing description has been made for the purposes of clearly, accurately and concisely setting forth the best embodiments of the invention. However, other forms of the invention will become readily apparent to those skilled in the art within the scope of the appended claims.

What is claimed is:

1. A seal for mounting between relatively rotatable members, comprising inner and outer annular sealing elements, each element comprising a radial wall portion and an annular axially directed flange on the wall portion in radial overlapping relation with the flange of the other element and developing a space therebetween, a disc-like sealing ring of flexible material having center and outer peripheral edges and fixedly mounted at one edge only on the flange of one element and extending radially across said space between the flanges as a barrier against the entry of dirt and the like through said space and developing a dirt pocket, and having its other peripheral axial edge in sliding engagement with the flange of the other element in an area axially displaced from said mounting at said one edge.

2. The invention according to claim 1 and said ring being axially distorted throughout its entire diametrical extent and converging with the wall portion of said other element and having a resilient character biasing the same to a relaxed position in the direction toward said last-mentioned wall portion.

3. The invention according to claim 1 and said ring further having an axially directed annular portion projecting from one side thereof stressed in compression between said flange of the one element and the said wall portion of the other element.

4. The invention according to claim 1 and said ring having a further radial sealing portion extending inwardly from said center edge.

5. A seal comprising a pair of axially telescoped relatively rotatable annular sealing elements, each element comprising a radial wall and an axially directed flange, the flange of each element projecting from the wall thereof toward the wall of the other element and radially spaced from the flange of the other element, a sealing ring of flexible material connected along one edge only to one of the flanges and projecting toward the flange on the other and having a frusto-conical circumferential edge in engagement with an opposed surface of the latter, said ring being larger radially than the distance between said flanges and stressed into a conical shape between the flanges and tending to assume a relaxed position biasing the peripheral edge thereof into said engagement with the respective flange, said ring spaced axially from said walls of both elements.

6. A seal comprising an inner and an outer annular metallic element, each element being U-shaped in cross-section including a radial wall and a pair of concentric inner and outer flanges axially directed toward the other element in intercalating relationship therewith, said outer flange of the inner element presenting an internal annular sealing surface facing the inner flange of the outer element and a sealing annulus of elastomer material connected to said inner flange of the outer element and extending outwardly therefrom and axially loaded and deformed into substantially conical shape and having an outer cylindrical edge in complementary wiping engagement with said sealing surface, said connection of the annulus with the inner flange being offset axially with respect to the area of wiping contact of the outer edge with said surface and said annulus spaced axially from the walls of both of said elements and being disposed at its connection closer to the wall of the outer element than the wall of the inner element.

7. A seal comprising an inner and an outer annular metallic element, each element being U-shaped in cross-section including a radial wall and a pair of concentric inner and outer flanges axially directed toward the other element in intercalating relationship therewith, said outer flange of the inner element presenting an internal annular sealing surface facing the inner flange of the outer element, and a sealing annulus of elastomer material connected to said inner flange of the outer element and extending outwardly therefrom and axially loaded and deformed into substantially conical shape and having an outer cylindrical edge in complementary wiping engagement with said sealing surface said connection of the annulus with the inner flange being offset axially with respect to the area of wiping contact of the outer edge with said surface and said annulus comprising an axial extension projecting toward the radial wall of the opposing element in sealing engagement therewith.

8. A seal comprising an inner and an outer annular metallic element, each element being U-shaped in cross-section including a radial wall and a pair of concentric inner and outer flanges axially directed toward the other element in intercalating relationship therewith, said outer flange of the inner element presenting an internal annular sealing surface facing the inner flange of the outer element, and a sealing annulus of elastomer material connected to said inner flange of the outer element and extending outwardly therefrom and axially loaded and deformed into substantially conical shape and having an outer cylindrical edge in complementary wiping engagement with said sealing surface said connection of the annulus with the inner flange being offset axially with respect to the area of wiping contact of the outer edge with said surface and said annulus comprising a further sealing ring projecting from the inner flange of the outer element to the inner flange of the inner element and slidably engaging the same and being deformed from a normal planar shape to conical form.

9. A seal for a bearing comprising inner and outer annular elements having oppositely extending flange portions in radially spaced overlapped relation and axially spaced radial wall portions, a sealing ring of elastomer material mounted about said flange of the outer element and having a sealed connection therewith and extending radially outwardly toward said flange on the inner element, said ring being normally flat and extending radially, said ring being distorted into substantially conical shape between said flanges to bias the same into sealing engagement, said ring being generally a flat, thin disk and being spaced axially from the radial wall portions of both elements and providing a dust pocket with the flanges and wall of the inner element.

References Cited in the file of this patent
UNITED STATES PATENTS

| | | |
|---|---|---|
| 2,240,252 | Bernstein | Apr. 29, 1941 |
| 2,373,443 | Armington | Apr. 10, 1945 |
| 2,509,461 | Ulseth | May 30, 1950 |
| 2,715,554 | Walberg | Aug. 16, 1955 |